(12) United States Patent
Voege

(10) Patent No.: US 9,272,343 B2
(45) Date of Patent: Mar. 1, 2016

(54) TOOL FOR MACHINING A WORKPIECE

(71) Applicant: HARTMETALL-WERKZEUGFABRIK PAUL HORN GMBH, Tübingen (DE)

(72) Inventor: Ruediger Voege, Rottenburg A.N. (DE)

(73) Assignee: HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 103 days.

(21) Appl. No.: 13/800,307

(22) Filed: Mar. 13, 2013

(65) Prior Publication Data
US 2013/0195568 A1    Aug. 1, 2013

Related U.S. Application Data

(63) Continuation of application No. PCT/EP2011/065722, filed on Sep. 12, 2011.

(30) Foreign Application Priority Data

Sep. 13, 2010   (DE) .......................... 10 2010 046 132

(51) Int. Cl.
*B23C 5/22*    (2006.01)
*B23C 5/10*    (2006.01)

(52) U.S. Cl.
CPC . *B23C 5/22* (2013.01); *B23C 5/109* (2013.01); *B23C 5/1045* (2013.01); *B23C 2210/02* (2013.01); *B23C 2210/03* (2013.01); *B23C 2226/125* (2013.01); *B23C 2226/31* (2013.01); *B23C 2226/315* (2013.01); *B23C 2240/08* (2013.01); *B23C 2240/16* (2013.01); *Y10T 407/192* (2015.01)

(58) Field of Classification Search
CPC .. B23C 5/22; B23C 2240/08; B23C 2240/16; B23C 2210/03; B23C 2226/125; B23C 2226/31; B23C 2226/315; B23C 5/1036; B23C 2210/165; Y10T 408/90993
USPC .......... 407/33, 40, 48, 42, 102; 409/232, 234; 408/233, 228, 227
See application file for complete search history.

(56) References Cited

U.S. PATENT DOCUMENTS 1,908,208 A * 5/1933 Yassenoff ........................ 76/115
1,923,488 A * 8/1933 Howard et al. ................ 175/426
2,911,707 A * 11/1959 Almen ............................... 407/3
2,982,008 A * 5/1961 Facknitz ........................ 407/101

(Continued)

FOREIGN PATENT DOCUMENTS

DE    26 53 302    6/1977
DE    44 47 558    2/1996

(Continued)

*Primary Examiner* — Sunil K Singh
*Assistant Examiner* — Sara Addisu
(74) *Attorney, Agent, or Firm* — Saliwanchik, Lloyd & Eisenschenk

(57) ABSTRACT

A tool for machining a workpiece, in particular a milling tool, is presented. The tool incorporates a shank which is drivable rotatably about a longitudinal axis and is fixable to a tool holding fixture. The tool further incorporates a plate holding fixture that is arranged on one end of the shank, a support plate having at least one internal thread, a cutting element with at least one cutting edge, and at least one fastening element which is provided with an external thread that is adapted to the at least one internal thread.

19 Claims, 5 Drawing Sheets

(56) References Cited

U.S. PATENT DOCUMENTS

| | | | |
|---|---|---|---|
| 3,059,316 A * | 10/1962 | Berry, Jr. et al. | 407/101 |
| 3,084,416 A * | 4/1963 | Broughton | 407/5 |
| 3,125,799 A | 3/1964 | Bennett | |
| 3,273,221 A * | 9/1966 | Ewing | 407/4 |
| 3,289,273 A * | 12/1966 | Artaud | 407/101 |
| 3,324,528 A * | 6/1967 | Buchmann et al. | 407/4 |
| 3,376,763 A * | 4/1968 | Welles | 408/199 |
| 3,624,879 A * | 12/1971 | Ayer | 407/101 |
| 3,686,729 A * | 8/1972 | Cochran | 407/101 |
| 3,825,981 A * | 7/1974 | Cochran et al. | 407/101 |
| 3,864,799 A * | 2/1975 | McCreery et al. | 407/101 |
| 4,050,840 A * | 9/1977 | Skingle | 408/144 |
| 4,066,376 A * | 1/1978 | Eckle et al. | 407/101 |
| 4,279,550 A * | 7/1981 | Kress et al. | 408/59 |
| 4,437,802 A * | 3/1984 | Hall, Jr. | 408/197 |
| 4,525,109 A * | 6/1985 | Bylund | 407/36 |
| 4,545,711 A * | 10/1985 | Dooley | 408/197 |
| 4,566,828 A | 1/1986 | Reinauer | |
| 4,708,537 A | 11/1987 | Elka et al. | |
| 5,108,234 A * | 4/1992 | Stojanovski | 407/40 |
| RE34,054 E * | 9/1992 | Millington et al. | 76/115 |
| 5,272,940 A * | 12/1993 | Diskin | 76/108.6 |
| 5,400,861 A | 3/1995 | Sheirer | 175/427 |
| 5,632,576 A * | 5/1997 | Storch | 407/32 |
| 5,704,742 A * | 1/1998 | Reinauer | 408/156 |
| 5,782,589 A * | 7/1998 | Cole | 408/233 |
| 5,915,888 A * | 6/1999 | Minicozzi | 407/54 |
| 5,967,706 A | 10/1999 | Hughes, Jr. | |
| 5,976,455 A * | 11/1999 | Pantzar et al. | 419/14 |
| 6,158,927 A * | 12/2000 | Cole et al. | 407/48 |
| 6,834,692 B2 * | 12/2004 | Lindsay et al. | 144/241 |
| 7,044,695 B2 * | 5/2006 | Stojanovski | 409/234 |
| 7,520,698 B2 * | 4/2009 | Hackman | 407/29 |
| 7,686,103 B2 * | 3/2010 | Pile | 175/292 |
| 7,806,633 B2 * | 10/2010 | Kovac | 407/113 |
| 8,007,208 B2 * | 8/2011 | Noureddine | 407/47 |
| 8,388,272 B2 * | 3/2013 | De Souza Filho et al. | 407/103 |
| 8,403,603 B2 * | 3/2013 | Zitzlaff et al. | 407/107 |
| 8,573,900 B1 * | 11/2013 | Hecht | 407/105 |
| 8,602,694 B2 * | 12/2013 | Morgulis | 407/25 |
| 2001/0033776 A1 | 10/2001 | Villa | |
| 2006/0002780 A1 | 1/2006 | Stojanovski | |
| 2006/0078402 A1 * | 4/2006 | Barnsdale | 411/178 |
| 2008/0166204 A1 * | 7/2008 | Nilsen | 411/378 |
| 2009/0245946 A1 * | 10/2009 | Maeda | 407/32 |
| 2009/0245952 A1 * | 10/2009 | Banduch et al. | 407/54 |
| 2010/0111621 A1 * | 5/2010 | Harif | 407/102 |
| 2011/0142556 A1 | 6/2011 | Oettle et al. | |
| 2014/0165369 A1 * | 6/2014 | Chan et al. | 29/525.11 |

FOREIGN PATENT DOCUMENTS

| | | | |
|---|---|---|---|
| EP | 1 147 841 | | 10/2001 |
| JP | 01222803 A | * | 9/1989 |
| WO | WO 2009-077060 | | 6/2009 |

* cited by examiner

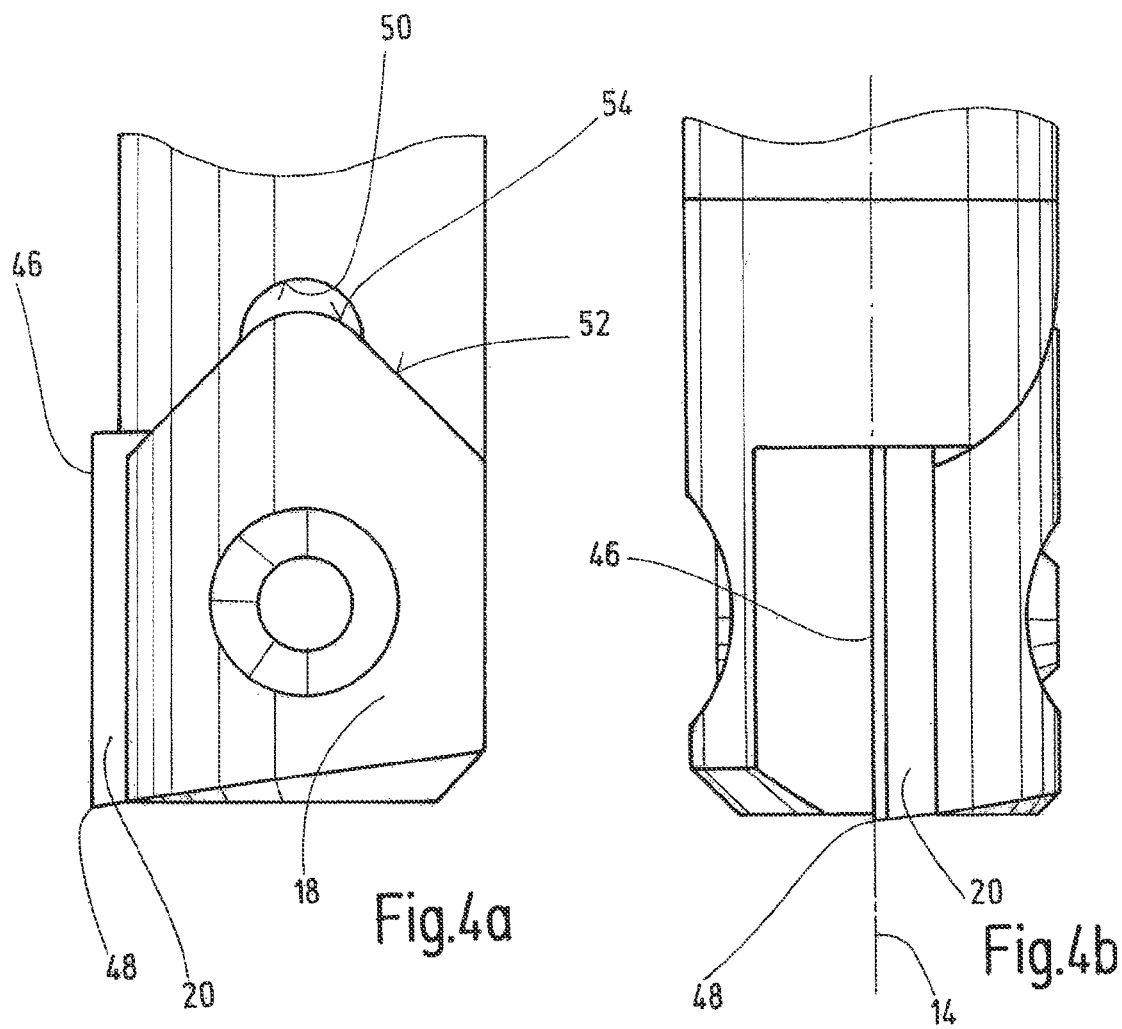
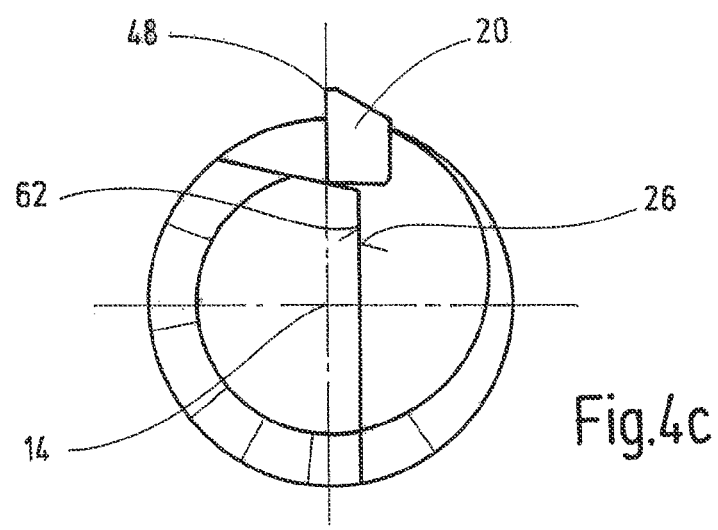

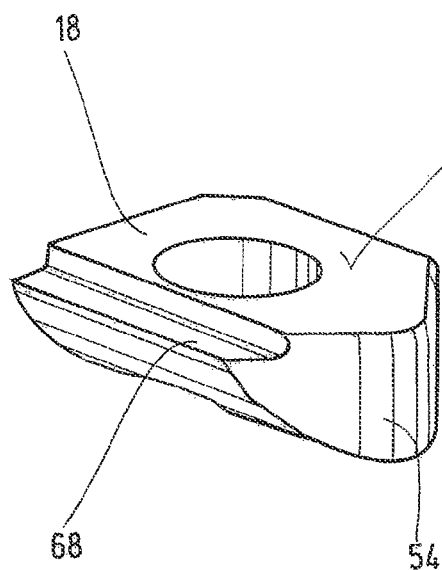
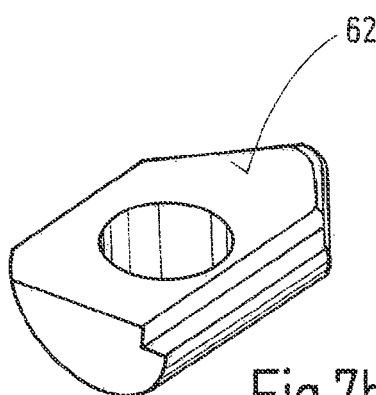
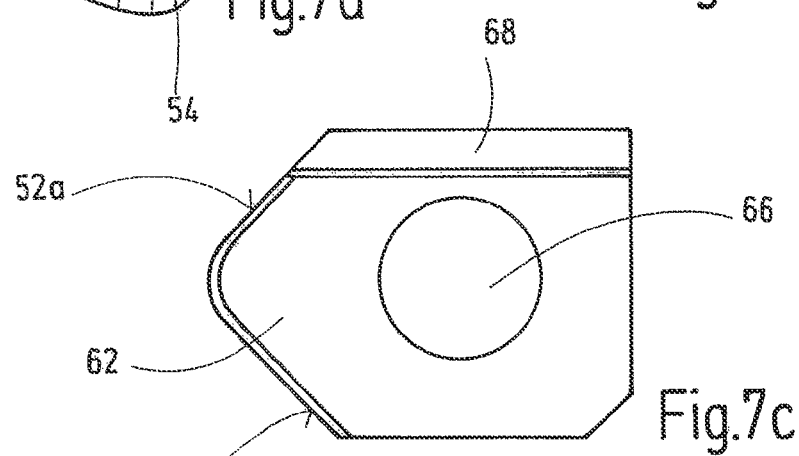
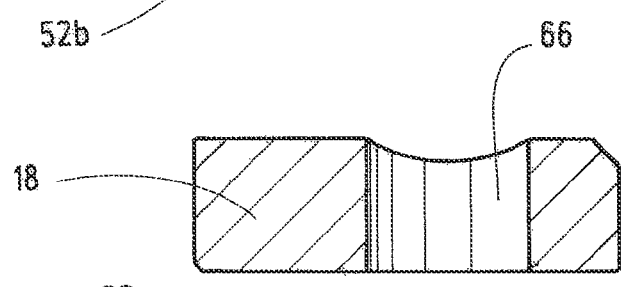
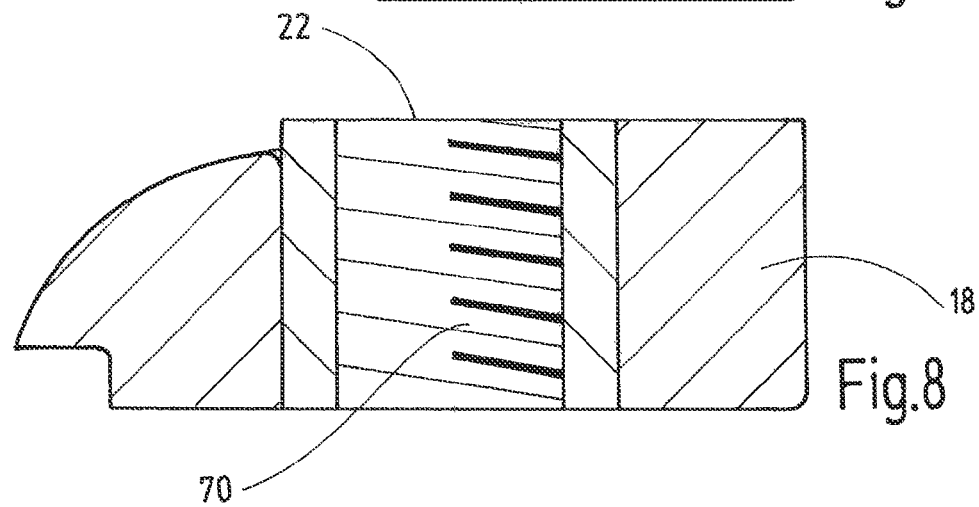

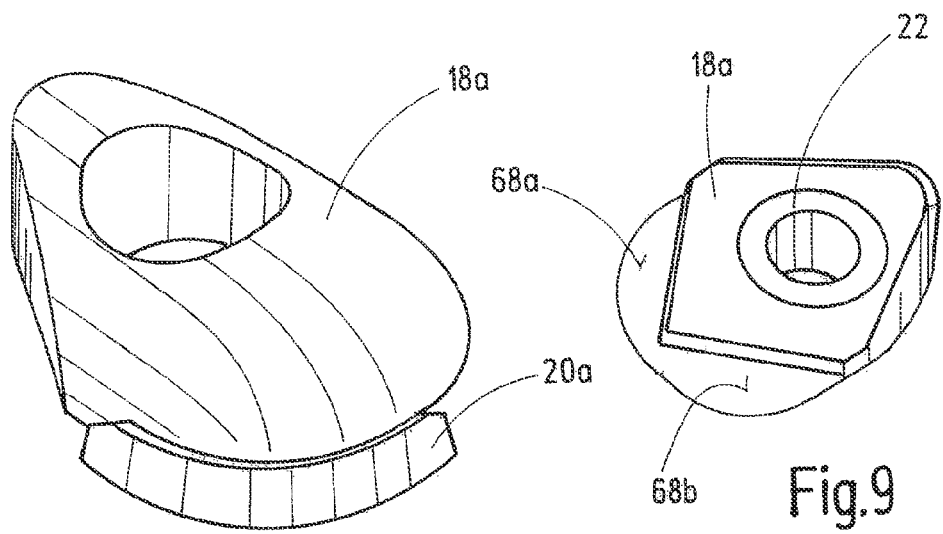
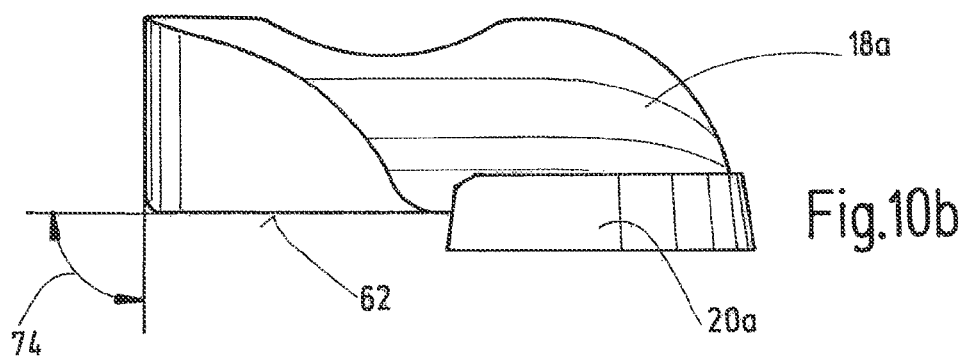
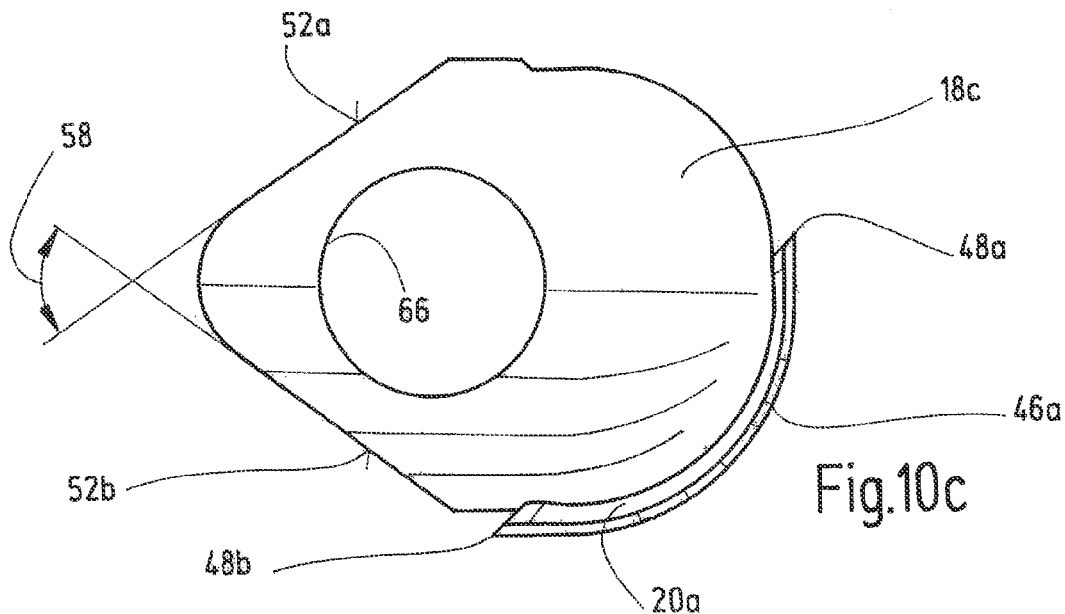

TOOL FOR MACHINING A WORKPIECE

CROSS-REFERENCE TO RELATED APPLICATIONS

This application is a continuation of international patent application PCT/EP2011/065722 (WO 2012/034964 A1), filed on Sep. 12, 2011 designating the U.S., which international patent application has been published in German language and claims priority from German patent application DE 10 2010 046 132.6, filed on Sep. 13, 2010, each of which is hereby incorporated by reference herein in its entirety, including any figures, tables, and drawings.

The disclosure relates to a tool for machining a workpiece, in particular a milling tool.

Tools for machining workpieces are extensively used in the processing of a multiplicity of materials. Machining, in particular machining with a geometrically defined cutting element, for example turning, drilling, counterboring, milling, planing, splicing or the like, permits a defined abrasion of material and is therefore suitable in particular for the automated processing of materials.

Machining tools frequently have cutting elements/cutting edges which consist of hard material or have coatings provided with said cutting edges. Examples here may include tool steels, carbides, sintered materials, ceramic inserts, or corundum or diamond materials.

In order, in the event of the cutting edge becoming worn, not to have to change the entire tool, interchangeable cutting inserts are generally provided. The latter may be fastened, for example, indirectly to a shank of the tool at a holding fixture. In this case, the fastening can be undertaken indirectly, for example via clamping connections, or else directly, for example by direct screwing or pressing.

It has been shown that elements which are necessary for fastening or securing and for aligning the cutting elements to and on the tool may involve boundary conditions which necessitate design measures which may have an effect on the performance capability and suitability of the tools for servicing and repair.

It is therefore an object to provide a tool for machining a workpiece, which, as far as possible, even with small dimensions, permits simple, rapid changing of the cutting tips and at the same time can ensure a high degree of strength and accuracy.

In view of this object, there is provided a tool for machining a workpiece, wherein the tool comprises a shank which is drivable rotatably about a longitudinal axis and is fixable to a tool holding fixture; a plate holding fixture that is arranged on one end of the shank; a support plate having at least one internal thread; a cutting element with at least one cutting edge; and at least one fastening element which is provided with an external thread that is adapted to the at least one internal thread; wherein the support plate is fixable to the plate holding fixture by means of the at least one fastening element in such a manner that the cutting element is centered.

A major advantage of this tool is that the support plate is weakened only in a smallest possible extent, since the screw connection is undertaken so to say "from the rear" and a constructional space, i.e. an additional recess, does not have to be reserved in the support plate for a head of the fastening element.

This is advantageous in particular if the tool has only a relatively small diameter and the support plate together with the cutting element turns out to be relatively large in relation thereto. Constructional space conditions of this type make indirect fastening, for example via clamping jaws, more difficult. In the case of direct fastening, for example axial screwing through the support plate in the direction of the longitudinal axis, small tools do not have sufficient constructional space in order, for example, to accommodate a screw head with a drive, which can be actuated by customary screwing tools.

In this connection, WO 2009/077060 A1 proposes, for a lathe tool, to provide a transverse bore in a cutting tip and to accommodate either a threaded insert or a screw therein in order to screw the cutting tip to the tool body by a corresponding screw or a corresponding threaded insert. The focus in this case is in particular on permitting a simple changing of the cutting tip, which is intended to be able to be undertaken from the front side or the rear side of the cutting tip depending on accessibility.

However, the solution in WO 2009/077060 A1 cannot be transferred to milling tools, since, in the latter, a lateral protruding of fastening elements, for example a screw head or a threaded sleeve, beyond the shank would make it impossible to operate the rotating tool. Accordingly, countersunk bores of a sufficient size would consequently have to be provided in the support plate in order to be able to mount the screw with the conical head extension or the threaded insert with the conical runout according to WO 2009/077060 A1 in a recessed manner. This would be associated, however, with excessive weakening of the support plate, increasing the susceptibility of the support plate to breaking.

In addition, in the case of rotatably driven tools for machining, in particular in the case of milling tools, there are increased requirements regarding the orientation of the support plate with the cutting element with respect to the longitudinal axis. The at least one cutting edge, on revolving about the longitudinal axis, describes a cutting circle on which the machining diameter is based. Even small deviations of the actual position of the cutting element from the desired position with respect to the longitudinal axis may result in significantly reduced accuracy of the machining.

A radial deviation has double the effect on the diameter of the cutting circle. Moreover, since the assignment of the support plate for holding the shank is generally also undertaken via mating surfaces in the form of planes, in the event of an offset of the planes, for example, the cutting edge may be tangentially shifted in relation to the desired diameter of the cutting circle.

In the case of a milling tool, the fastening of the support plate therefore also has to ensure the orientation of the support plate in addition to the positional securing and therefore ultimately the orientation of the cutting element.

Accordingly, WO 2009/077060 A1 is not suitable for suggesting the subject matter of the application.

According to a refinement, the shank has a diameter of a maximum of 12 mm, preferably a maximum of 10 mm, furthermore preferably a maximum of 7 mm.

Customary approaches for fastening and orienting changeable support plates are ruled out specifically in the case of relatively thin and long shanks. In order to be able to bring about a highest possible abrasive power, high cutting speeds have to be operated, but these are associated with increased loading of the cutting element and of the support plate. In order to be able to transmit said loads via the plate holding fixture and the shank, the fastening element has to be correspondingly dimensioned. However, in the case of a fastening element which is basically designed to be releasable in order to replace the support plate together with the cutting element, a drive has to be provided. Said drive is arranged, for example, in the screw head in the case of a screw. Since, however, the screw head must not protrude laterally beyond the shank of the tool, a corresponding recess has to be reserved in order to be able to recess said screw head. In addition, however, the drive has to be able to transmit a certain moment so that the operator, when changing the support plate, does not simply slip through with the screwing tool to the drive. Therefore, head dimensions which are as small as possible are desired and minimum dimensions permitting release of the fastening element are required. In the above-mentioned refinement, a homogeneous configuration furthermore ensures balancing.

The shank diameter may be, for example, 6 mm, wherein the fastening means has a head diameter of approximately 4 mm and a thread diameter of, for example, M 2.5. The countersunk bore required for this would result, when the support plate is fastened from the front, in a weakening which would significantly increase the risk of breaking.

According to a further refinement, the cutting circle has a diameter of a maximum of 15 mm, preferably a maximum of 13 mm, furthermore preferably a maximum of 10 mm.

The cutting circle therefore has only a very small excess size in relation to the shank diameter. With the stated machining diameter, this makes it possible to realize a maximum shank strength permitting shank lengths which enable the tool to be deeply inserted into a workpiece.

It should be noted that the cutting circle diameter in the abovementioned example is 7 mm, i.e. is only 1 mm over the diameter of the shank. It is therefore clear that the components required for the fastening of the support plate can be arranged within said restricted construction space.

According to a further refinement, the plate holding fixture is provided with a bearing surface and a groove, wherein the groove tapers in the direction of a groove base, wherein at least one recess reaches through the bearing surface, and wherein the bearing surface and at least one side surface of the groove enclose an internal angle which corresponds to an external angle of the support plate and is preferably 90°.

By means of this measure, the support plate can be adequately geometrically oriented prior to being fastened with the fastening element. In this case, the groove can interact with corresponding countersurfaces of the support plate and can determine the axial position of the support plate on the shank.

In addition, the groove can predetermine the radial position of the cutting element with the at least one cutting edge with respect to the longitudinal axis.

In addition, the bearing surface can describe a plane which is arranged parallel to the longitudinal axis or intersects the latter and against which a countersurface of the support plate can come to bear.

In the given axial position and radial position of the cutting element, the bearing surface determines whether the at least one cutting edge is directly on the cutting circle or else, in the event of an erroneous position, is offset tangentially slightly from the circle circumference.

Despite easy accessibility, a support plate can therefore simply be inserted and a high degree of positional accuracy is brought about.

In addition, the extensive bearing can absorb high moments or forces and can therefore relieve the load on the fastening element as such. The immediate result of this is that the fastening can be dimensioned to be correspondingly small, and the support plate therefore only has to be slightly weakened, for example in order to provide the internal thread.

According to a further refinement, the support plate has at least one threaded insert which is provided with the internal thread and is oriented perpendicularly to the longitudinal axis.

The strength of the support plate can therefore also be increased and, in particular, the risk of breaking further reduced.

Support plates customarily consist of particularly hard and therefore also relatively brittle materials. The introduction of a thread into such materials may necessitate a high outlay on manufacturing, or else may be technologically entirely impossible depending on the degree of hardness and the size of the thread. It is therefore advantageous merely to provide a bore, for example a dowel bore, in the support plate and to accommodate a threaded insert therein.

The threaded insert can consist of a material which is tougher than the material of the support plate. The immediate risk of breaking at the thread is therefore also reduced.

According to a further refinement, the at least one fastening element has a head with a drive, wherein the at least one fastening element is feedable from a side remote from the bearing surface of the plate holding fixture, wherein the head is recessable in the at least one recess, and wherein the at least one fastening element and the at least one recess preferably have a cone.

The "weakening" is thereby undertaken in the plate holding fixture on the shank. However, although the material used there may, for example, be less hard, it may be tougher for this purpose, and therefore there is not a high risk of breaking even in the case of a recess in the form of a countersunk bore with a cone.

The head of the fastening element may be recessed completely or virtually completely in the plate holding fixture; at any rate such that it is ensured that the head does not protrude beyond the cutting circle of the tool.

A conical orientation of the fastening element on the plate holding fixture results in an additional position-fixing option.

According to a further refinement, the support plate is fixable with respect to the longitudinal axis in such a manner that at least sections of the at least one cutting edge run in a desired plane which intersects the longitudinal axis and preferably runs parallel to the bearing surface.

The desired orientation can also be ensured therewith. In particular, there need be no concern about any dimensional deviation due to an angular offset between the cutting edge and the longitudinal axis.

According to a further refinement, the cutting edge has at least one reference point which, on revolving, describes a desired cutting circle of the tool.

The reference point may be, for example, a corner point or else a particularly exposed point of the cutting edge. Said point, on revolving about the longitudinal axis, inevitably describes a circle; with the support plate being oriented previously, it is ensured that said circle corresponds to the desired cutting circle of the tool.

According to a further refinement, the cutting element has at least one cutting edge, at least sections of which are rectilinear and which runs parallel to the longitudinal axis.

A line of action of the tool in the workpiece can thereby be produced, the line of action permitting a high degree of abrasion and enabling the machining of rectilinear walls.

According to a further refinement, the cutting element has at least one cutting edge, at least sections of which are curved, in particular in the shape of an arc of a circle.

It is therefore possible for, for example, spherical or elliptical geometries or else fillets to be introduced into workpieces.

According to a further refinement, the tool has a diameter to length ratio of at least 1:8, preferably at least 1:10, furthermore preferably of at least 1:12.

The tool is therefore particularly suitable for machining steps in which there is more difficult access to the workpiece and, for example, deep insertion is required.

According to a further refinement, the groove is in the form of a V groove and has an opening angle which is a maximum of 100°, preferably approximately 90°, furthermore preferably a maximum of 90°, and a hollow is preferably provided in the groove base.

A V-groove permits easy feeding in of the support plate. The support plate to a certain extent "automatically" finds its desired orientation. The support plate has surfaces corresponding to the V-groove.

In addition, the configuration of the groove permits axial forces and, at least partially, also radial forces to be absorbed. A relieving of the load of the fastening element can be associated therewith and this can find expression in the dimensioning thereof.

According to a further refinement, the at least one recess on the bearing surface is formed as a countersunk bore, is oriented perpendicularly to the longitudinal axis and intersects the longitudinal axis.

The support plate can thereby be assigned via elements which can be produced in a simple manner and the position and orientation of which can be checked with little outlay.

In addition, it is preferred if the at least one fastening element has a head with a drive, which has a recessed form-fitting element for rotational entrainment, preferably a hexagon socket or a hexalobular socket.

The support plate with the cutting element can therefore be changed in a particularly simple manner using a commercially available tool. In this case, it is possible, despite the small dimensions, to configure the head on the fastening element to be of a size ensuring good accessibility and handleability.

In particular if the tool is accessible only from one side, the support plate can be released from the rear side of the plate holding fixture by release of the fastening element and to a certain extent removed "blind". Subsequently, a new support plate with a fresh cutting element and cutting edge can likewise be fed in "blind"; the configuration of the plate holding fixture permits simple orientation. The screwing of the fastening element to the support plate secures the support plate and centers the cutting edge.

According to a further refinement, the at least one threaded insert is accommodated in the support plate in an integrally bonded or frictional manner, and is preferably soldered or pressed therein.

Connecting methods of this type ensure adequate strength. Since the elements contributing to centering the support plate on the plate holding fixture are also designed to absorb forces and moments which act on the support plate, the screw connection, and therefore the threaded insert, are relieved of load, which can be expressed in the dimensioning thereof.

It shall be noted that the features of the invention which are mentioned above and those which have yet to be explained below are usable not only in the respectively stated combination, but also in different combinations or on their own without departing from the scope of the present invention.

Further features and advantages of the invention emerge from the description below of a plurality of preferred exemplary embodiments with reference to the drawings, in which:

FIGS. 4a, 4b, 4c show three projected views of the tool according to FIG. 1;

FIGS. 7a, 7b show two perspective views of a support plate for use in the case of the presented tool;

FIG. 7c shows a view of the support plate according to FIG. 7a from the lower side;

FIG. 7d shows a sectional view of the support plate according to FIG. 7a;

FIG. 8 shows a sectional view of the support plate according to FIG. 7a with a threaded insert;

FIG. 9 shows a perspective view of a further support plate for use in the case of the presented tool;

FIG. 10a shows a perspective view of the support plate according to FIG. 9 with a cutting element; and FIGS. 10b, 10c show two projected views of the support plate according to FIG. 10a.

Figure 1:
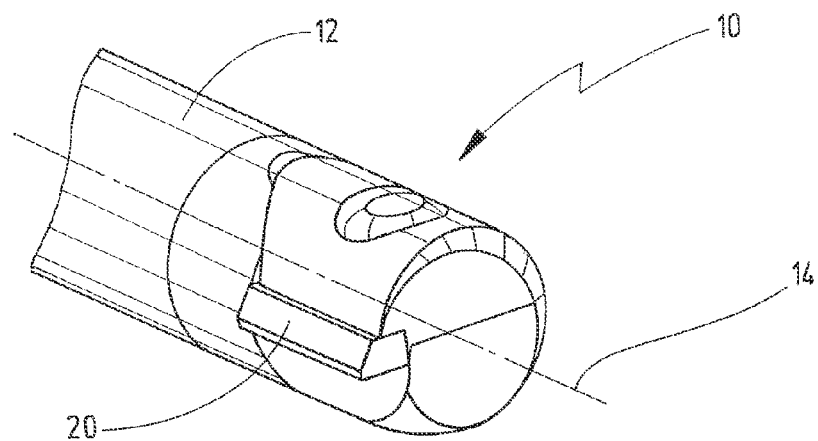
FIG. 1 shows a perspective view of a tool according to an embodiment.

A tool according to an embodiment is illustrated in FIG. 1 and is denoted overall by 10. The tool 10 is illustrated in broken form in FIG. 1, in order to illustrate the size ratios, compare FIG. 6.

The tool 10 is a milling tool with a shank 12 which is rotatable about a longitudinal axis 14. During the rotation about the longitudinal axis 14, a cutting element 20 with a cutting edge 46 describes a cutting circle along which a workpiece is abraded during a machining action.

Figure 2:
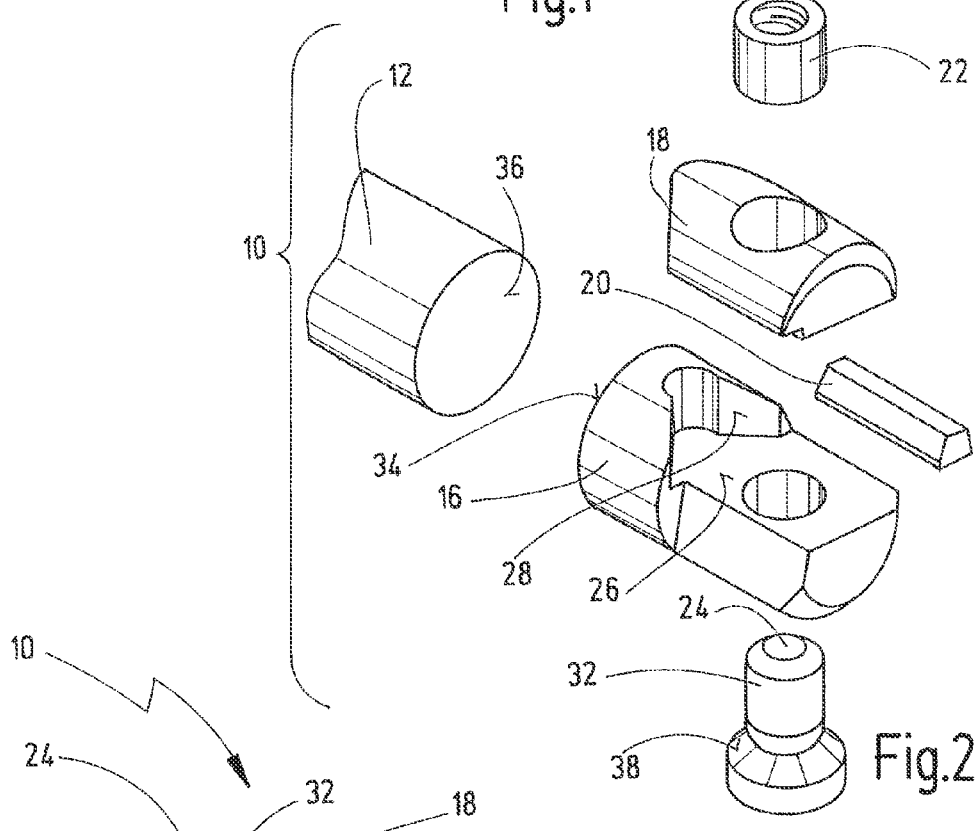
FIG. 2 shows a view of the tool according to FIG. 1 in the exploded state.

Details of the tool 10 are apparent with reference to the exploded illustration in FIG. 2. The tool 10 has a holding fixture 16 (also denoted as plate holding fixture 16) which can be fastened to the shank 12, or else, alternatively, can be formed integrally therewith.

In addition, a support plate 18 which serves to hold the cutting element 20 is provided. A threaded insert 22 is accommodated in the support plate 18. The support plate 18 together with the threaded insert 22 can be fixed to the holding fixture 16 via a fastening element 24, which is feedable to the threaded insert 22 from the rear through the holding fixture 16. In the process, the support plate 18 comes to bear against a back surface 26 (also denoted as bearing surface 26) of the plate holding fixture 16. In addition, the plate holding fixture 16 is provided with a groove 30 which has side surfaces 28 which taper in the direction of a groove base, cf. also FIG. 4a and FIG. 5b.

According to the illustration of FIG. 2, the holding fixture 16 can be fixed to a contact surface 36 of the shank 12 via a contact surface 34. This may be undertaken, for example, in an integrally bonded manner, for example by means of soldering or welding.

By subdividing the tool 10 into different components, it is possible to configure each component in a suitable manner with regard to the purpose thereof and the loads thereof. For example, the shank 12 can be manufactured with little outlay from a round material and can have a high degree of toughness, but can be less hard than the other components. The shank 12 is adjoined by the holding fixture 16 which has to be manufactured with great precision in order, in conjunction with the other components, to be able to ensure the orientation of the support plate 18.

The support plate 18 can be manufactured from a relatively hard material, for example a carbide. The cutting element 20 which is particularly hard can be fastened to the support plate 18 itself.

The cutting element 20 can consist, for example, of CBN (Cubic Boron Nitride) or of a diamond material, and in particular can be in the form of a monocrystalline diamond. In addition, the cutting element 20 may also be formed integrally with the support plate 18, for example in the form of a carbide cutting tip. In this case, the cutting element 20 can be provided with a coating increasing the hardness.

Figure 3:
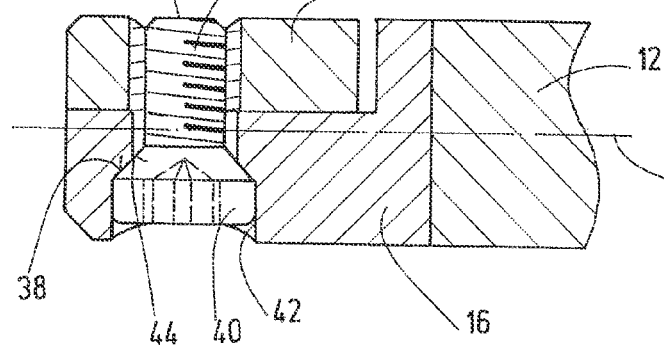
FIG. 3 shows a side view of the tool according to FIG. 1 with a section through the holding fixture.

FIG. 3 illustrates a section through the plate holding fixture 16 and the support plate 18. It can be seen that the fastening element 24 is designed in the form of a screw, in particular a clamping screw, and is completely recessed in the plate holding fixture 16 and the support plate 18. Therefore, on revolution of the tool 10, no part of the fastening element 24 protrudes outward.

The fastening element 24 is arranged in a recess 42 in the plate holding fixture 16. The recess 42 is in the form of a countersunk bore or stepped bore. A head 40 of the fastening element 24 is accommodated in a first section of the recess 42. Adjacent thereto, the recess 42 has a cone 44 in which a cone 38 of the fastening element 24 comes to bear. This results in a highly precise orientation of the fastening element 24 in the recess 42.

The head 40 furthermore has an inwardly directed drive, for example a Torx, a hexagon socket or a hexalobular socket.

The sought orientation of the cutting edge 20 with respect to the longitudinal axis 14 is explained with reference to FIGS. 4a, 4b and 4c.

In a milling tool, it is generally endeavored to orient the tool centrally, i.e. with respect to the longitudinal axis 14. In the present case, the tool 10 has a rectilinear cutting edge 46 which runs parallel to the longitudinal axis 14. Said orientation is produced via the orientation of the support plate 18 in relation to the holding fixture 16. For this purpose, mating surfaces 52a, b of the support plate 18 come to bear against side surfaces 28, cf. FIG. 2, FIG. 5b and the groove 30 of the plate holding fixture 16. In addition, the back surface 26 of the holding fixture 16 comes to bear against a mating surface 62 of the support plate 18.

The groove base of the groove 30 is provided with a hollow 50 (also denoted as cut-in) which has a clearance for a rounded portion 54 of the support plate 18. It is therefore ensured that the support plate 18 is oriented in the groove 30 of the holding fixture 16 via the side surfaces 28 and the mating surfaces 52a, b corresponding thereto.

It can be seen in FIG. 4c that a reference point 48, which embodies an end point of the cutting edge 46 of the cutting element 20, on revolving about the longitudinal axis 14 describes a cutting circle which is only a little larger than the diameter of the shank 12. It therefore has to be ensured that no components of the tool 10 protrude outward substantially over the diameter of the shank 12. Equally, the high forces and moments required for a high cutting power have to be transmitted via the shank 12 of the tool 10 to the cutting element 20 and finally into the workpiece. A configuration conflict may be produced specifically in the case of tools 10 with a small diameter.

Easy accessibility and at the same time simple changing of a support plate having a worn or broken cutting edge has to be made possible; at the same time, the support plate itself must not be weakened to an extent such that the risk of the latter breaking increases. Furthermore, when changing the support plate with the cutting element, the desired centering of the cutting edge has to be produced without a large outlay.

This circumstance is taken into account by the screw connection of the support plate 18 being undertaken from the rear through the plate holding fixture 16. The large opening, the recess 42, is therefore provided on the holding fixture while the support plate 18 merely has to have an internal thread 70, cf. FIG. 8. In addition, the plate holding fixture 16 and the support plate 18 have shaped elements which firstly ensure that said components are oriented with respect to each other and therefore bring about the centering of the cutting element 20 and secondly are also designed in order to absorb at least some of the forces transmitted during the machining of a workpiece such that said forces do not have to be absorbed by the screw connection of the support plate 18 to the holding fixture 16.

Figure 5A:
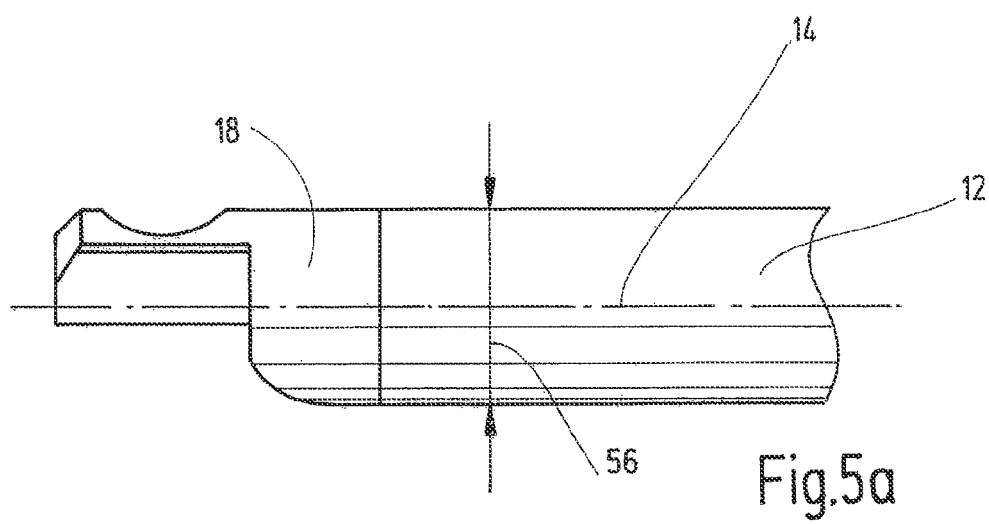
FIGS. 5a, 5b show a side view and a top view of a holding fixture and of a shank of the tool according to FIG. 1.
Figure 5B:
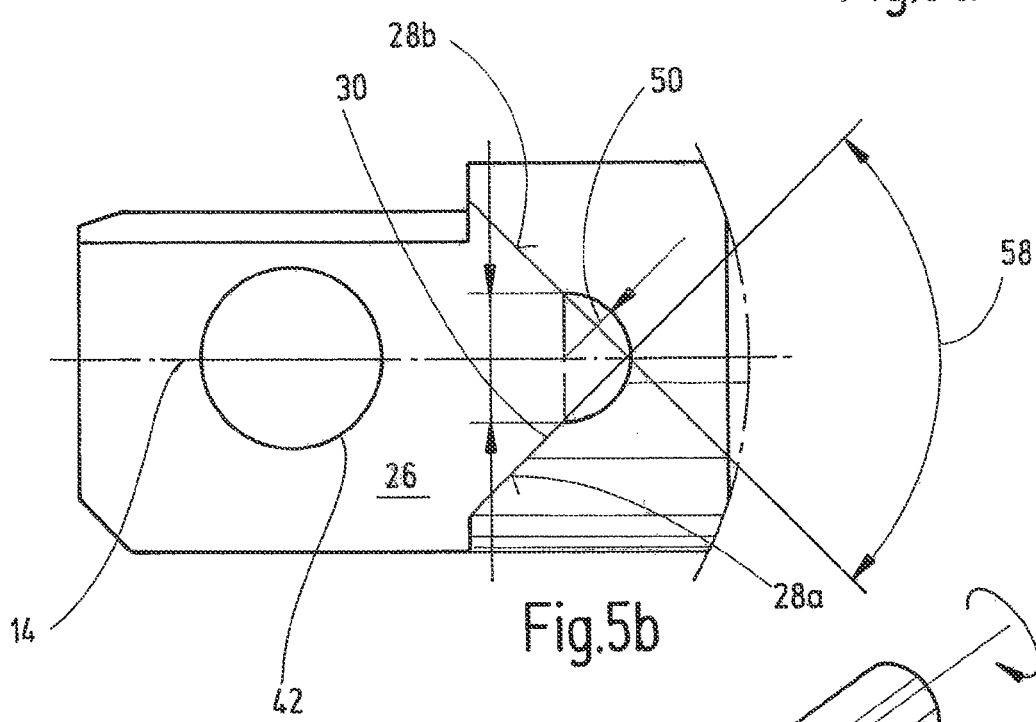

FIG. 5a illustrates a side view of the support plate 18 and of a part of the shank 12 adjoining the latter. FIG. 5b shows an illustration rotated through 90° and enlarged in relation to FIG. 5a. In the present case, the side surfaces 28a and 28b of the groove 30 enclose an angle which is denoted by 58 and is 90°. Furthermore, each of the side surfaces 28a, 28b is arranged at a right angle to the bearing surface 26.

The support plate 18 has a basically similar contour, and therefore an orientation is readily produced by pushing the support plate 18 into the groove 30 of the holding fixture 16.

Figure 6:
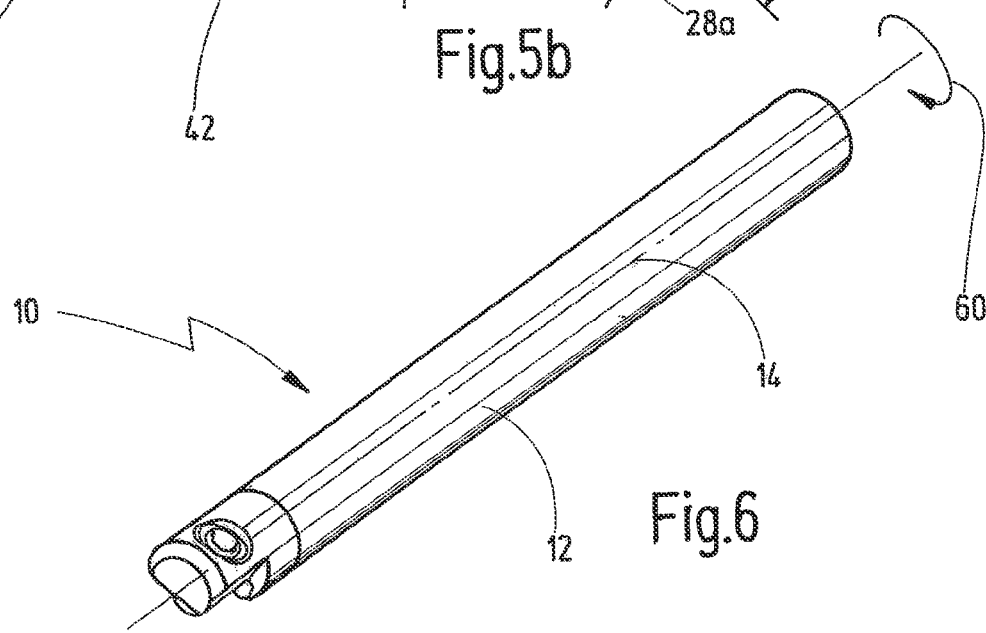
FIG. 6 shows a perspective view of the tool according to FIG. 1 in its entirety with the support plate being omitted.

FIG. 6 clarifies, by way of example, a diameter to length ratio of the hand tool 10. The example at the basis of the illustration has a shank 12 which is provided with a diameter of 6 mm and has a length of 72 mm. Overall, a length of approximately 82 mm arises when the holding fixture 16 is fixed to the shank 12. Known approaches for fastening support plates or cutting tips are not suitable for such long and slender tools.

FIGS. 7a, 7b, 7c and 7d illustrate a support plate 18 to which a cutting element is not yet fixed. In order to fasten a cutting element, for example the cutting element 20 according to FIG. 2, a cutting element holder 68 which ensures the desired orientation of the cutting element 20 is provided. The cutting element 20 can be fixed, for example, in an integrally bonded manner to the support plate 18.

FIG. 7d illustrates the support plate 18 in the section through a bore 66 into which the sleeve, which has the thread 70, is inserted in the illustration of FIG. 8.

In principle, the thread 70 may also be produced directly in the support plate 18, but this is associated with a very high outlay in particular in the case of particularly hard and brittle materials. Given small dimensions of the support plate 18, it can therefore be recommended to provide the thread 70 in an additional component, the threaded insert 22. In this case, the threaded insert 22 may be pressed or soldered to the support plate 18, or accommodated in a frictional or form-fitting manner in another suitable way.

In principle, a sufficiently tough material can be used for the threaded insert 22, and therefore the risk of breaking can be significantly reduced in comparison to a thread introduced, for example, directly into a support plate 18 made of a carbide.

FIG. 9 illustrates a support plate 18a which, in principle, can be used with a cutting element having a curved cutting edge or a cutting edge in the shape of an arc of a circle.

In FIGS. 10a, 10b, 10c, the support plate 18a is provided with a cutting element which is denoted by 20a and, for example, describes the shape of a quarter circle. Using a tool 10 with such a cutting element 20a, it is possible, for example, for rounded portions or the like to be introduced into workpieces. The cutting element 20a is basically fastened analogously to the fastening of the cutting element 20 to the support plate 18.

However, two cutting element holders 68a, 68b are indicated in FIG. 9, and therefore the cutting element 20a can be arranged, in principle, on the tool 10 in two positions symmetrical with respect to the longitudinal axis 14. An approximately semicircular cutting element is also conceivable. The support plate 18a is oriented in relation to the holding fixture again via mating surfaces 52a, 52b, 52c. For example, the mating surfaces 52a, 52b, which are designed to correspond to the side surfaces 28 of the groove 30, have a common included angle 58 which is <90°. By contrast, the mating surface 62 encloses a right angle with each of the mating surfaces 52a and 52b, indicated by an arrow denoted by 74.

In summary, a tool is provided which, even with particularly small dimensions, in particular with a small diameter, ensures that the cutting element and the support plate carrying the latter are highly stable and, in the event of wear, ensures simple and rapid exchangeability with a consistently high degree of accuracy.

The invention claimed is:

1. A tool for machining a workpiece comprising;
a shank which is drivable rotatably about a longitudinal axis and is fixable to a tool holding fixture,
a plate holding fixture that is arranged on one end of the shank,
a support plate having at least one internal thread,
a cutting element with at least one cutting edge, wherein the cutting element is fixed in an integrally bonded manner to the support plate, and
at least one fastening element which is provided with an external thread that is adapted to the at least one internal thread,
wherein the plate holding fixture comprises a groove and a bearing surface for bearing the support plate,
wherein two side surfaces of the groove taper towards each other in a direction of a base of the groove, such that the two side surfaces of the groove enclose an internal angle,
wherein at least one recess reaches through the bearing surface,
wherein the support plate comprises a bearing mating surface and two side mating surfaces,
wherein the two side mating surfaces of the support plate taper towards each other to form an external angle, and
wherein the support plate is fixable to the plate holding fixture by way of the at least one fastening element in such a manner that the bearing mating surface of the support plate bears against the bearing surface of the plate holding fixture, each side mating surface of the two side mating surfaces of the support plate bears against a corresponding side surface of the two side surfaces of the groove, and the cutting element is positioned with respect to the longitudinal axis.

2. The tool as claimed in claim 1, wherein the tool is a milling tool.

3. The tool as claimed in claim 1, wherein the shank has a diameter that is less than or equal to 12 mm.

4. The tool as claimed in claim 1,
wherein, when the support plate is fixed to the plate holding fixture by way of the at least one fastening element such that the cutting element is positioned with respect to the longitudinal axis, the at least one cutting edge, on revolving about the longitudinal axis, follows a path of a cutting circle, and
wherein the cutting circle has a diameter that is less than or equal to 15 mm.

5. The tool as claimed in claim 1, wherein the internal angle is 90°.

6. The tool as claimed in claim 1,
wherein the at least one fastening element has a head with a drive and is feedable in from a side remote from the bearing surface of the plate holding fixture,
wherein the head is recessable in the at least one recess.

7. The tool as claimed in claim 6,
wherein the at least one recess comprises a cone-shaped recess surface and the head of the at least one fastening element comprises a cone-shaped head surface,
wherein the cone-shaped recess surface and the cone-shaped head surface mate with each other.

8. The tool as claimed in claim 1,
Wherein, when the support plate is fixed to the plate holding fixture by way of the at least one fastening element such that the cutting element is positioned with respect to the longitudinal axis, at least sections of the at least one cutting edge run in a desired plane which intersects the longitudinal axis and runs parallel to the bearing surface of the plate holding fixture.

9. The tool as claimed in claim 1,
wherein the two side surfaces of the groove taper towards each other in the direction of the base of the groove, such that the groove is in the form of a V groove having an opening angle, and wherein the opening angle is less than or equal to 100°.

10. The tool as claimed in claim 1,
wherein a cut-in is provided in the base of the groove.

11. The tool as claimed in claim 1,
wherein the at least one recess in the bearing surface is in the form of a countersunk bore, is oriented perpendicularly to the longitudinal axis, and intersects the longitudinal axis.

12. The tool as claimed in claim 1,
wherein the support plate comprises at least one threaded insert which is provided with the at least one internal thread and is oriented perpendicular to the longitudinal axis.

13. The tool as claimed in claim 12,
wherein the at least one threaded insert is accommodated in the support plate in an integrally bonded or frictional manner.

14. The tool as claimed in claim 1,
wherein the at least one cutting edge comprises at least one rectilinear section that runs parallel to the longitudinal axis.

15. The tool as claimed in claim 1,
wherein the at least one cutting edge comprises at least one arc-shaped section.

16. The tool as claimed in claim 1,
wherein the tool has a diameter to length ratio of at least 1:8.

17. The tool as claimed in claim 1,
wherein the at least one fastening element has a head with a drive, which has a recessed form-fitting element for rotational entrainment.

18. The tool as claimed in claim 1,
wherein the cutting element comprises a different material than the support plate.

19. The tool as claimed in claim 1,
wherein the cutting element consists of cubic boron nitride or of a diamond material, and wherein the support plate consists of carbide.

* * * * *